(12) United States Patent
Sarkar et al.

(10) Patent No.: US 9,773,019 B2
(45) Date of Patent: Sep. 26, 2017

(54) CREATING A USER'S PROXIMITY MODEL IN ACCORDANCE WITH A USER'S FEEDBACK

(71) Applicant: Tata Consultancy Services Limited, Mumbai (IN)

(72) Inventors: Sourjya Sarkar, Kolkata (IN); Debnath Mukherjee, Kolkata (IN); Anupam Basu, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 399 days.

(21) Appl. No.: 14/626,953

(22) Filed: Feb. 20, 2015

(65) Prior Publication Data

US 2016/0048767 A1    Feb. 18, 2016

(30) Foreign Application Priority Data

Aug. 16, 2014    (IN) .......................... 2625/MUM/2014

(51) Int. Cl.
  *G06F 9/44*    (2006.01)
  *G06N 7/02*    (2006.01)
  (Continued)

(52) U.S. Cl.
  CPC ....... *G06F 17/30241* (2013.01); *G06N 7/023* (2013.01)

(58) Field of Classification Search
  USPC .......................................................... 706/52
  See application file for complete search history.

(56) References Cited

U.S. PATENT DOCUMENTS 4,839,823 A    6/1989 Matsumoto
4,860,214 A    8/1989 Matsuda et al.
(Continued)

FOREIGN PATENT DOCUMENTS

EP    1459505 B1    4/2013

OTHER PUBLICATIONS

Farmland Quality Evaluation Based on GIS and Fuzzy Matter-Element Proximity Cluster Model Yan Nie; Jing Yu; Yong Zhou; HongZhi Wang 2008 International Symposium on Knowledge Acquisition and Modeling Year: 2008 pp. 823-827, DOI: 10.1109/KAM.2008.127 IEEE Conference Publications.*
(Continued)

*Primary Examiner* — Michael B Holmes
(74) *Attorney, Agent, or Firm* — Shumaker, Loop & Kendrick, LLP

(57) ABSTRACT

Disclosed is a method and Geographic Information System (GIS) for creating a user's proximity model in accordance with a user's feedback. The GIS creates the user's proximity model using a Dempster-Shafer technique. The GIS initializes the user's proximity model upon initializing a fuzzy set with a fuzzy membership function. The fuzzy set includes a plurality of points scattered around a reference point. The GIS creates an intermediate model using the user's proximity model by selecting a group of points from the plurality of points. The GIS receives a user feedback on the intermediate model. The GIS adapts the fuzzy membership function based on the user feedback. The GIS then updates the user's proximity model based on the fuzzy membership function which is adapted on basis of the user feedback.

13 Claims, 3 Drawing Sheets

(51) Int. Cl.
*G06N 7/06* (2006.01)
*G06F 17/30* (2006.01)

(56) References Cited

U.S. PATENT DOCUMENTS

| | | | | |
|---|---|---|---|---|
| 9,131,281 | B2* | 9/2015 | Sinha | .................. H04N 21/235 |
| 9,201,692 | B2* | 12/2015 | Maiti | ........................ G06F 8/30 |
| 9,510,050 | B2* | 11/2016 | Mukherjee | ....... H04N 21/44222 |
| 9,612,663 | B2* | 4/2017 | Sinha | ...................... G06F 3/017 |

OTHER PUBLICATIONS

Driver behavior assessment based on the belief theory in the driver-vehicle-environment system Oussama Derbel; Rene Landry 2015 IEEE International Conference on Vehicular Electronics and Safety (ICVES) Year: 2015 pp. 7-12, DOI: 10.1109/ICVES.2015.7396885 IEEE Conference Publications.*

Cognizance and Ameliorate of Quality of Service Using Aggregated Intutionistic Fuzzy C-Means Algorithm, Abettor-Based Model, Corroboration Method, and Pandect Method in Cloud Computing N. V. Satya Naresh Kalluri; Divya Vani Yarlagadda 2016 IEEE 6th International Conference on Advanced Computing (IACC) Year: 2016 pp. 84-95, IEEE.*

Fuzzy partitions for texture modelling adapted to the subjectivity of human perception Pedro Manuel Martinez-Jimenéz; Jesús Chamorro-Martinez; José Manuel Soto-Hidalgo 2016 IEEE International Conference on Fuzzy Systems (FUZZ-IEEE) Year: 2016 pp. 1105-1112, DOI: 10.1109/FUZZ-IEEE.2016.7737811 IEEE Conference Publications.*

A fuzzy based recommendation system with collaborative filtering Md Mahfuzur Rahman Siddiquee; Naimul Haider; Rashedur M Rahman the 8th International Conference on Software, Knowledge, Information Management and Applications (SKIMA 2014) Year: 2014 pp. 1-8, DOI: 10.1109/SKIMA.2014.7083524 IEEE Conference Publications.*

Takagi-Sugeno Fuzzy Models in the Framework of Orthonormal Basis Functions Jeremias B. Machado; Ricardo J. G. B. Campello; Wagner Caradori Amaral IEEE Transactions on Cybernetics Year: 2013, vol. 43, Issue: 3 pp. 858-870, DOI: 10.1109/TSMCB.2012.2217323 IEEE Journals & Magazines.*

John Yen; "Generalizing the Dempster-Shafer Theory to Fuzzy Sets"; USC Information Sciences Institute 4676 Admiralty Way, Marina del Rey, USA, Mar. 2013; p. 382-391; 10 pages.

* cited by examiner

CREATING A USER'S PROXIMITY MODEL IN ACCORDANCE WITH A USER'S FEEDBACK

CROSS-REFERENCE TO RELATED APPLICATION AND PRIORITY

The present application claims priority from an Indian Patent Application No. 2625/MUM/2014 filed on Aug. 16, 2014.

TECHNICAL FIELD

The present disclosure, in general, relates to developing a user's proximity model.

BACKGROUND

A user may query a Geographic Information System (GIS) for determining spatial relations between geographical locations. The spatial relations may be associated to directions, proximity or containment between the geographical locations. In response to a search query input by the user, the GIS may guide the user. In one example, the user may query the GIS for determining a direction to a specific geographical location/orientation/direction such as "hotels towards north direction." The directions are broadly categorized into east, west, north, and south direction. Based upon the user query, the GIS may determine a location of the user and may subsequently determine hotels present towards the north of the user.

In one instance, the search query presented by the user to the GIS may relate to containment within a geographical location. For example, the search query may be "hotels within Delhi." The search results may not involve any fuzziness as geographical coordinates of Delhi are precisely defined. The GIS may thus determine the hotels present within the geographical coordinates bounding an area of Delhi, and may subsequently present the search results to the user.

However, in another instance, the search query presented by the user may be related to proximity/nearness. For example, the search query may be "hotels nearby Delhi." In the present case, the search query involves a keyword "nearby." A perception of the word "nearby (near)" may vary with each user as scope of the word is not defined/crisp. Thus, every time the GIS presents the search results to the user, there may be fuzziness associated with the search results due to undefined terms used in the search query.

In order to receive appropriate search results related to queries having undefined/subjective/relative terms like near, a user's proximity model may be created. The user's proximity model may determine a perception of the user with respect to the queries comprising such words/terms. Conventional GIS may accept a binary feedback for creating the user's proximity model and may not be able to create an appropriate user's proximity model based upon the binary feedback.

Further, the conventional GIS, while creating the user's proximity model, may present only a single point to the user for accepting the user feedback. Therefore, conventional GIS may require a large number of iterations to create the user's proximity model and thus increase complexity.

SUMMARY

Disclosed are systems and methods for creating a user's proximity model in accordance with a user's feedback and the aspects are further described below in the detailed description. This summary is not intended to limit the scope of the claimed subject matter.

In one implementation, a method for creating a user's proximity model in accordance with a user's feedback is disclosed. The method includes initializing a user's proximity model upon initializing a fuzzy set with a fuzzy membership function. The fuzzy set includes a plurality of points scattered around a reference point. Each point of the plurality of points is associated with an integer. The integer indicates a degree of closeness of the plurality of points with respect to the reference point. The method further includes creating an intermediate model. The intermediate model is created using the user's proximity model by selecting a group of points from the plurality of points. The group of points is selected based upon a Kaufmann's index of fuzziness ($K_f$). The intermediate model is then presented to the user. The method further includes receiving a user feedback on the intermediate model. The user feedback is a score lying in a predefined range. The method further includes adapting the fuzzy membership function ($\mu_A$) for the user's proximity model using a Dempster-Shafer technique. The fuzzy membership function ($\mu_A$) is adapted based on the user feedback. The method includes computing a belief function and a plausibility function based upon the user feedback. The method further includes computing a tuning parameter ($\alpha$) using the belief function and the plausibility function. The fuzzy membership function ($\mu_A$) is then adapted based upon the tuning parameter ($\alpha$). The method further includes updating the user's proximity model based upon the fuzzy membership function ($\mu_A$).

In one implementation, a system for creating a user's proximity model in accordance with a user's feedback is disclosed. The system includes an interface and a memory coupled to the processor for executing programmed instructions stored in the memory. The processor initializes a user's proximity model upon initializing a fuzzy set with a fuzzy membership function ($\mu_A$). The fuzzy set includes a plurality of points scattered around a reference point. Each point of the plurality of points is associated with an integer. The integer indicates a degree of closeness with respect to the reference point. The processor further creates an intermediate model using the user's proximity model by selecting a group of points from the plurality of points. The group of points is selected based upon a Kaufmann's index of fuzziness ($K_f$). The intermediate model is presented to the user. The processor further receives a user feedback on the intermediate model. The user feedback is a score lying in a predefined range. The processor further adapts the fuzzy membership function ($\mu_A$) for the user's proximity model using a Dempster-Shafer technique. The fuzzy membership function ($\mu_A$) is adapted based on the user feedback. The processor computes a belief function and a plausibility function based upon the user feedback. The processor further computes a tuning parameter ($\alpha$) using the belief function and the plausibility function. The fuzzy membership function ($\mu_A$) is then adapted based upon the tuning parameter ($\alpha$). The processor further updates the user's proximity model based upon the fuzzy membership function ($\mu_A$).

In one implementation, a non-transitory computer readable medium embodying a program executable in a computing device for creating a user's proximity model in accordance with a user's feedback is disclosed. The program includes a program code for initializing a user's proximity model upon initializing a fuzzy set with a fuzzy membership function ($\mu_A$). The fuzzy set includes a plurality of points scattered around a reference point. Each point of the plurality of points is associated with an integer. The integer indicates a degree of closeness with respect to the reference point. The program further includes a program code for creating an intermediate model using the user's proximity model by selecting a group of points from the plurality of points. The group of points is selected based upon a Kaufmann's index of fuzziness ($K_f$). The intermediate model is presented to the user. The program further includes a program code for receiving a user feedback on the intermediate model. The user feedback is a score lying in a predefined range. The program further includes a program code for adapting the fuzzy membership function ($\mu_A$) for the user's proximity model using a Dempster-Shafer technique. The fuzzy membership function ($\mu_A$) is adapted based on the user feedback. The program further includes a program code for computing a belief function and a plausibility function based upon the user feedback. The program further includes a program code for computing a tuning parameter ($\alpha$) using the belief function and the plausibility function. The fuzzy membership function ($\mu_A$) is then adapted based upon the tuning parameter ($\alpha$). The program further includes a program code for updating the user's proximity model based upon the adapted fuzzy membership function ($\mu_A$).

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
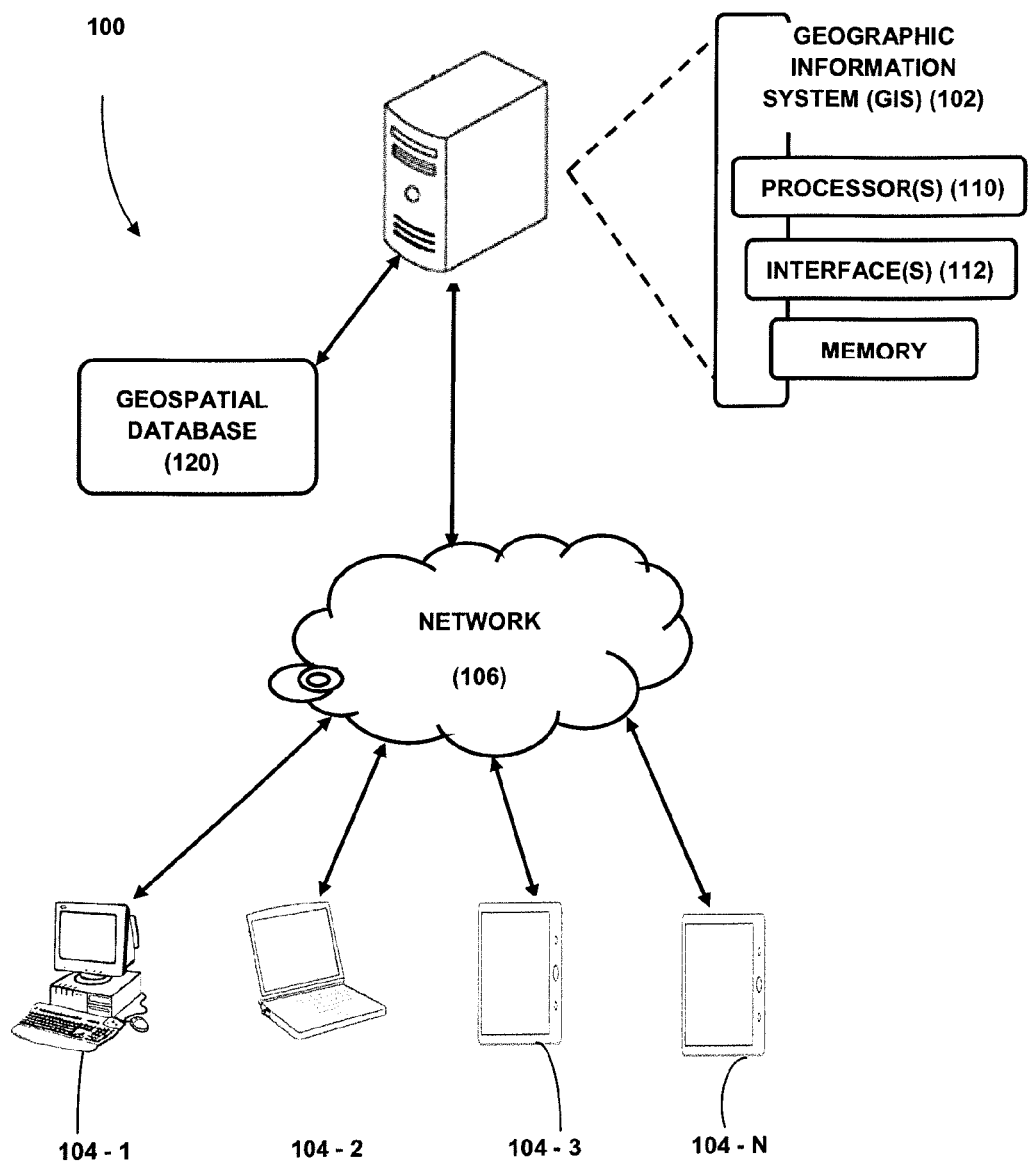
FIG. 1 illustrates a network implementation of a Geographic Information System (GIS) for creating a user's proximity model in accordance with a user's feedback, in accordance with an embodiment of the present subject matter.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings. Disclosed are Geographic Information System (GIS) and methods for creating a user's proximity model in accordance with a user's feedback. The user's proximity model may also be referred to as a spatial proximity model, a user's spatial proximity model, a user specific model, or a user specific proximity model. The user's proximity model captures and stores a user perception of being near i.e nearness. In order to create the user's proximity model, the GIS may initialize a user's proximity model upon initializing a fuzzy set with a fuzzy membership function ($\mu_A$). The fuzzy set comprises a plurality of points scattered at different locations around a reference point. Further, each point of the plurality of points may be associated with an integer. The integer may indicate a degree of closeness of each point with respect to the reference point.

Further, the GIS may create an intermediate model using the user's proximity model. Specifically, the system may select a group of points from the plurality of points. In one example, the system may select the group of points based upon a Kaufmann's index of fuzziness ($K_f$). Thus, the intermediate model may consist of the group of points. The intermediate model may then be presented before the user for receiving a user feedback. The user feedback may be presented in form of a score. The score may comprise a value lying in a predefined range. Further, the score may indicate a degree of user acceptance of the intermediate model.

The GIS may further compute a belief function and a plausibility function, based on the user feedback, using a Dempster-Shafer technique. Subsequently, the GIS may compute a tuning parameter using the belief function and the plausibility function. The tuning parameter may be used to adapt the fuzzy membership function ($\mu_A$). Further, the user's proximity model may be updated based upon the fuzzy membership function ($\mu_A$) derived from the user feedback. The user's proximity model may be updated iteratively until a convergence criterion is satisfied. The convergence criterion may get satisfied when the fuzzy membership function ($\mu_A$) becomes identical for a predefined number of successive iterations.

To summarize, the steps of the acquisition process are: 1) a user's proximity model may be initialized by initializing a fuzzy set (A) with a fuzzy membership function ($\mu_A$). The fuzzy set may comprise of a plurality of points scattered around a reference point. 2) A user feedback may be accepted on the plurality of points presented to a user. In case the user feedback (score) is <10, the acquisition process may comprise the steps of, 3) Creating an intermediate model (a fuzzy subset B) based on a group of points selected from the fuzzy set A. The group of points may be selected based on a normalized Kaufman's index. The intermediate model may be displayed to the user. Further, the user feedback in [0,10] may be accepted for the intermediate model. 4) A tuning parameter ($\alpha_k$) may be derived based on the user feedback using a Dempster-Shafer technique. The fuzzy membership function ($\mu_A$) for the fuzzy set A may be adapted using the tuning parameter. 5) The user's proximity model may be updated by a fuzzy union operation or a fuzzy intersection operation of the fuzzy set A with a fuzzy set defined by the fuzzy membership function adapted at the step 4. 6) In case the convergence criterion is not satisfied the intermediate model may be created at the step 3.

While aspects of described Geographic Information System (GIS) and method for creating a user's proximity model in accordance with a user's feedback may be implemented in any number of different computing systems, environments, and/or configurations, the embodiments are described in the context of the following exemplary system.

Referring now to FIG. 1, a network implementation 100 of a Geographic Information System (GIS) 102 for creating a user's proximity model in accordance with a user's feedback is illustrated, in accordance with an embodiment of the present subject matter. In one embodiment, the GIS 102 may initialize a user's proximity model upon initializing a fuzzy set with a fuzzy membership function ($\mu_A$). The fuzzy set comprises a plurality of points having an integer value associated with each point of the plurality of points. The plurality of points may be scattered around a reference point. The GIS 102 may create an intermediate model using the user's proximity model by selecting a group of points from the plurality of points. The group of points may be selected based on a Kaufmann's index of fuzziness ($K_f$). Further, the GIS 102 may accept a user feedback towards a user acceptance of the intermediate model. Further, the GIS 102 may also capture a user's intermediate acceptance of the intermediate model using the user feedback. The GIS 102 may adapt the fuzzy membership function ($\mu_A$) using the user feedback. The GIS 102 may then update the user's proximity model based upon the fuzzy membership function ($\mu_A$). Further, the GIS 102 may update the user's proximity model in an iterative manner, until a convergence criterion is satisfied.

Although the present subject matter is explained considering that the Geographic Information System (GIS) 102 is implemented on a server, it may be understood that the GIS 102 may also be implemented in a variety of computing systems, such as a laptop computer, a desktop computer, a notebook, a workstation, a mainframe computer, a server, a network server, and the like. In one implementation, the GIS 102 may be implemented in a cloud-based environment. It will be understood that the GIS 102 may be accessed by multiple users through one or more user devices 104-1, 104-2, 104-3, 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the GIS 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Referring again to the FIG. 1, the Geographic Information System (GIS) 102 is illustrated in accordance with an embodiment of the present subject matter. In one embodiment, the GIS 102 may include at least one processor 110, an input/output (I/O) interface 112, and a memory 114. The at least one processor 110 may be implemented as one or more microprocessors, microcomputers, microcontrollers, digital signal processors, central processing units, state machines, logic circuitries, and/or any devices that manipulate signals based on operational instructions. Among other capabilities, the at least one processor 110 is configured to fetch and execute computer-readable instructions stored in the memory 114.

The I/O interface 112 may include a variety of software and hardware interfaces, for example, a web interface, a graphical user interface, and the like. The I/O interface 112 may allow the GIS 102 to interact with a user directly or through the client devices 104. Further, the I/O interface 112 may enable the GIS 102 to communicate with other computing devices, such as web servers and external data servers (not shown). The I/O interface 112 can facilitate multiple communications within a wide variety of networks and protocol types, including wired networks, for example, LAN, cable, etc., and wireless networks, such as WLAN, cellular, or satellite. The I/O interface 112 may include one or more ports for connecting a number of devices to one another or to another server.

The memory 114 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
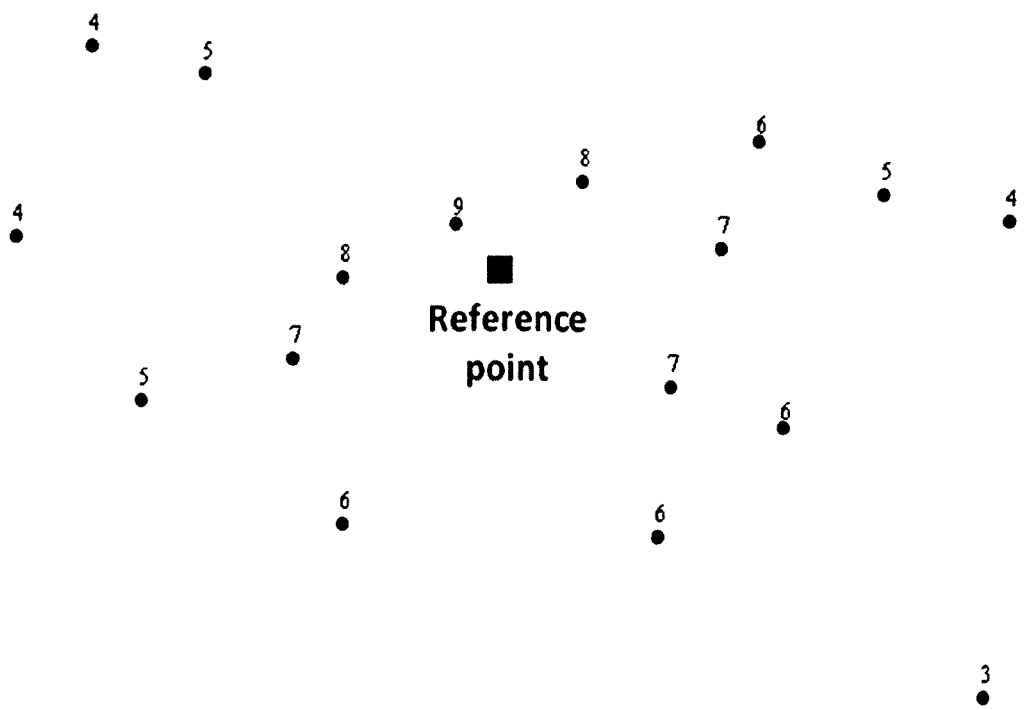
FIG. 2 illustrates a spatial diagram of the user's proximity model created by the Geographic Information System (GIS), in accordance with an embodiment of the present subject matter.

In one implementation, at first, the Geographic Information System (GIS) 102 may initialize a user's proximity model upon initializing a fuzzy set with a fuzzy membership function ($\mu_A$). In one example, the user's proximity model may be identified as a fuzzy set A. The fuzzy set A may comprise a plurality of points scattered around a reference point. The plurality of points may be scattered at different distances from the reference point. Further, each point of the plurality of points may be associated with an integer. The integer may indicate a degree of closeness with respect to the reference point. FIG. 2 illustrates a spatial diagram of the user's proximity model created by the GIS 102. In one example, as shown in the FIG. 2, bigger the integer nearer the point will be from the reference point. In another example, a converse equation between the integer and the distance may also be applicable.

In one embodiment, initializing the fuzzy set A may involve computing the fuzzy membership function ($\mu_A$) and a tuning parameter ($\alpha$). The fuzzy membership function ($\mu_A$) may be computed using a below mentioned Equation 1, $$\mu_A = \exp(-\alpha x_i) \quad \text{(Equation 1)}$$

Here, in the Equation 1, "$x_i$" denotes a distance of "$i^{th}$" point from the reference point, and "$\alpha$" denotes the tuning parameter.

Further the tuning parameter ($\alpha$) may be initialized using a below mentioned Equation 2, $$\alpha = -\ln(k)/\max(x_i) \quad \text{(Equation 2)}$$

Here, in the Equation 2, 'k' denotes a real number lying in a range of [0.01, 0.2], max ($x_i$) denotes a maximum distance of the plurality of points from the reference point and "ln" indicates a natural logarithm.

The fuzzy membership function ($\mu_A$) is a negative exponential function. Thus, value of the fuzzy membership function ($\mu_A$) may decrease monotonically with an increase in distance of each point of the plurality of points from the reference point. Further, when represented in a graph, a slope or a steepness of the fuzzy membership function ($\mu_A$) may depend on the tuning parameter ($\alpha$). This means that increasing a value of the tuning parameter ($\alpha$) may result in a higher resolution of points closer to the reference. Conversely, decreasing the value of the tuning parameter ($\alpha$) may result in a lower resolution of the points closer to the reference. Here, resolution refers to distinguishing points located close to the reference than the points located farther to the reference.

Post computing the fuzzy membership function ($\mu_A$) and the tuning parameter ($\alpha$), the GIS 102 may split or divide a range of the fuzzy membership function ($\mu_A$) into fuzzy intervals. In one example, the GIS 102 may split a range of the fuzzy membership function ($\mu_A$) using a uniform thresholding technique. Each of the fuzzy intervals may be assigned a distinct integer. Each of the distinct integers may indicate a degree of nearness of the fuzzy intervals to the reference point. Further, each point of the plurality of points, belonging to the fuzzy intervals, may be labeled using the distinct integers associated with the fuzzy intervals respectively.

After initializing the user's proximity model (fuzzy set A), the GIS 102 may create an intermediate model. The intermediate model may also be referred as an intermediate spatial proximity model. The GIS 102 may create the intermediate model from the user's proximity model. For an example, the intermediate model may be a fuzzy set B derived from the fuzzy set A. The GIS 102 may create the intermediate model (fuzzy set B) upon selecting a group of points from the plurality of points present in the fuzzy set A. Further, the GIS 102 may select the group of points based on a Kaufmann's index of fuzziness ($K_f$). The Kaufmann's index of fuzziness ($K_f$) may indicate user's perception about a crisp/precise/non-fuzzy set. The Kaufmann's index of fuzziness ($K_f$) may be set in accordance with a concept of de-fuzzification, where de-fuzzification implies translating a fuzzy category into a precise output. Further, the concept of de-fuzzification aims to distinguish between the user's perception of being near and being far.

In one case, expected values of the Kaufmann's index of fuzziness ($K_f$) may be used as sampling weights for selecting the group of points. The expected values of the Kaufmann's index of fuzziness ($K_f$) may represent a weighted average of values of the Kaufmann's index of fuzziness ($K_f$). The weighted average of the values of the $K_f$ may be associated with the user's proximity model(s) in agreement and disagreement to a user's belief of nearness. In order to achieve a probability distribution, the GIS 102 may further normalize the expected values of the Kaufmann's index of fuzziness ($K_f$). The GIS 102 may normalize the expected values of the Kaufmann's index of fuzziness ($K_f$) into a unit interval of [0, 1]. In one embodiment, the expected values of the Kaufmann's index of fuzziness ($K_f$) may be normalized by dividing each of the expected values of the Kaufmann's index of fuzziness ($K_f$) by a sum of the expected values of the Kaufmann's index of fuzziness ($K_f$). Post normalization, the probability distribution of the expected values of the Kaufmann's index of fuzziness ($K_f$) may be sampled using a discrete random sampling technique and the group of points may thus be selected. The group of points may constitute to the intermediate model. In one embodiment, the step of creating the intermediate model may be performed iteratively.

Post creating the intermediate model i.e., the fuzzy set B, the GIS 102 may present the intermediate model to the user. The GIS 102 may then accept a user feedback on the intermediate model. The user feedback may indicate a degree of acceptance of the user for the intermediate model. The GIS 102 may accept the user feedback in the form of a score. In one case, the score may be in a predefined range of 0 to 10. A user's disagreement, user's partial agreement, or a user's complete agreement to the intermediate model may be captured by the GIS 102 using the score. A lower value of the score may indicate a lesser degree of user's acceptance towards the intermediate model. Similarly, a higher value of the score may indicate a higher degree of user's acceptance towards the intermediate model. Further, an intermediate value of the score may correspond to the user's partial agreement or partial disagreement to the intermediate model. In one embodiment, the steps of presenting the intermediate model to the user and accepting the user feedback on the intermediate model may be performed iteratively.

In one embodiment, the user may provide the score of a value less than 10. The score of the value less than 10 may correspond to the partial agreement of the user to the intermediate model. In case of the partial agreement of the user, the GIS 102 may start acquiring the user's perception of nearness. Firstly, while acquiring, the GIS 102 may divide the score by 10. Upon dividing the score by 10, the score may be scaled to a value in an interval of [0, 1]. A scaled value of the score may then be used as a mass/basic probabilistic assignment according to the Dempster-Shafer technique. Generally, the mass may express a degree of belief/support for a collection of elements defined by a non-fuzzy or crisp set. In the present case, the mass may express the degree of support for the group of points present in the intermediate model. Further, the mass may be distributed, using the Dempster-Shafer technique, amongst the group of points present in the intermediate model. The mass may be distributed such that a sum of the mass distributed amongst the group of points equals to the mass. For more details on the Dempster-Shafer technique, a publication by John Yen, entitled, "Generalizing the Dempster-Shafer theory to fuzzy sets," IEEE Systems, Man and Cybernetics 20(3), 1990, 559-570, may be referred.

Upon distributing the mass among the group of points present in the intermediate model, the GIS 102 may compute a belief function (Bel) and a plausibility function (Pl) using the distributed mass. For example, the belief function (Bel) and the plausibility function (Pl) for the fuzzy set B may be represented as Bel (B) and Pl (B) respectively. The GIS 102 may compute the belief function Bel (B) and the plausibility function Pl (B) using the Dempster-Shafer technique. The belief function Bel (B) and the plausibility function Pl (B) may represent a minimum and a maximum evidence in support of the intermediate model, respectively. Further, the belief function Bel (B) and the plausibility function Pl (B) may refer to two values bounding a belief interval [Bel (B) Pl (B)]. The belief interval [Bel (B) Pl (B)] may represent an uncertainty associated with the intermediate model. Higher value of the belief function Bel (B) and a lower value of the belief interval [Bel (B) Pl (B)] may refer to strong evidence in support of the fuzzy set B. In one embodiment, the step of calculating the belief function Bel (B) and the plausibility function Pl (B) may be performed iteratively.

The GIS 102 may further compute the tuning parameter ($\alpha$) using the belief function Bel (B) and the plausibility function Pl (B). In a case when Pl (B)−Bel (B)≠0, the tuning parameter ($\alpha$) may be computed using a below mentioned Equation 3, $$\alpha_k = Bel(B)/(Pl(B) - Bel(B)) \quad \text{(Equation 3)}$$

In another case when Pl (B)−Bel (B)=0, the tuning parameter ($\alpha$) may be computed using a below mentioned Equation 4, $$\alpha_k = Bel(B) \quad \text{(Equation 4)}$$

Here, in the Equation 3 and the Equation 4, 'k' denotes a running iteration number.

After determining a value of the tuning parameter ($\alpha$), the GIS 102 may adapt the fuzzy membership function ($\mu_A$) on basis of the value of the tuning parameter ($\alpha$). Upon adapting, the fuzzy membership function ($\mu_A$) may be redefined based on the value of the tuning parameter ($\alpha$). The GIS 102 may then update the user's proximity model based upon the fuzzy membership function ($\mu_A$). For example, the user's proximity model upon getting updated may be identified as a fuzzy set C. The GIS 102 may further update the user's proximity model in an iterative manner until a convergence criterion is satisfied. The convergence criterion may get satisfied when the fuzzy membership function ($\mu_A$) remains identical for a predefined number of successive iterations. In one example, the predefined number of successive iterations may be set as two. Thus, the GIS 102 may compare values of the fuzzy membership function ($\mu_A$) for each of the iterations. In case of a successful match of the values of the fuzzy membership function ($\mu_A$), the GIS 102 may terminate the process of updating the user's proximity model.

Further, the user's proximity model, which may be a user specific spatial proximity model, may also be updated using a fuzzy union operation or a fuzzy intersection operation, for each of the iterations. The fuzzy union operation and the fuzzy intersection operation are well known in the art. Further, the fuzzy union operation or the fuzzy intersection operation may be performed on the user's proximity model (fuzzy set A). Post updating the user's proximity model, the GIS 102 may present the user's proximity model to the user. The user's proximity model may then be used by the user for making an informed decision.

In one embodiment, the user may use the GIS 102 for receiving search results in response to a search query. In one case, the user may use the user device 104 for providing the search query to the GIS 102. The search query may be associated with at least one geographic criterion. The geographic criterion may be selected from the group consisting of a geographical location, a geographical direction, a geographical distance, and a geographical area.

In one embodiment, the geographic criterion may be the geographical location. For example, the search query may be "nearby gas stations," "nearby hotels," "nearby hospitals," "historical places close to Mumbai," "nearby railway stations," "closest bus stops" and the like. In one example, the search query provided by the user may be "nearby hotels." Post receiving the search query, the GIS 102 may determine the search results upon searching on a geospatial database 120 connected to the GIS 102. In present case, the GIS 102 may determine the hotels nearby to a current location of the user. Further, the search results determined by the GIS 102 may be based on the user's proximity model. The user's proximity model acquired in accordance with the user perception of nearness may be used to determine the search results. The search results, based on the user's proximity model, comprising the nearby hotels may thus be presented to the user. In case the user finds the search results inappropriate or changes his/her perception of nearness, the user may again update or learn the user's proximity model using the methods as described above.

Figure 3:
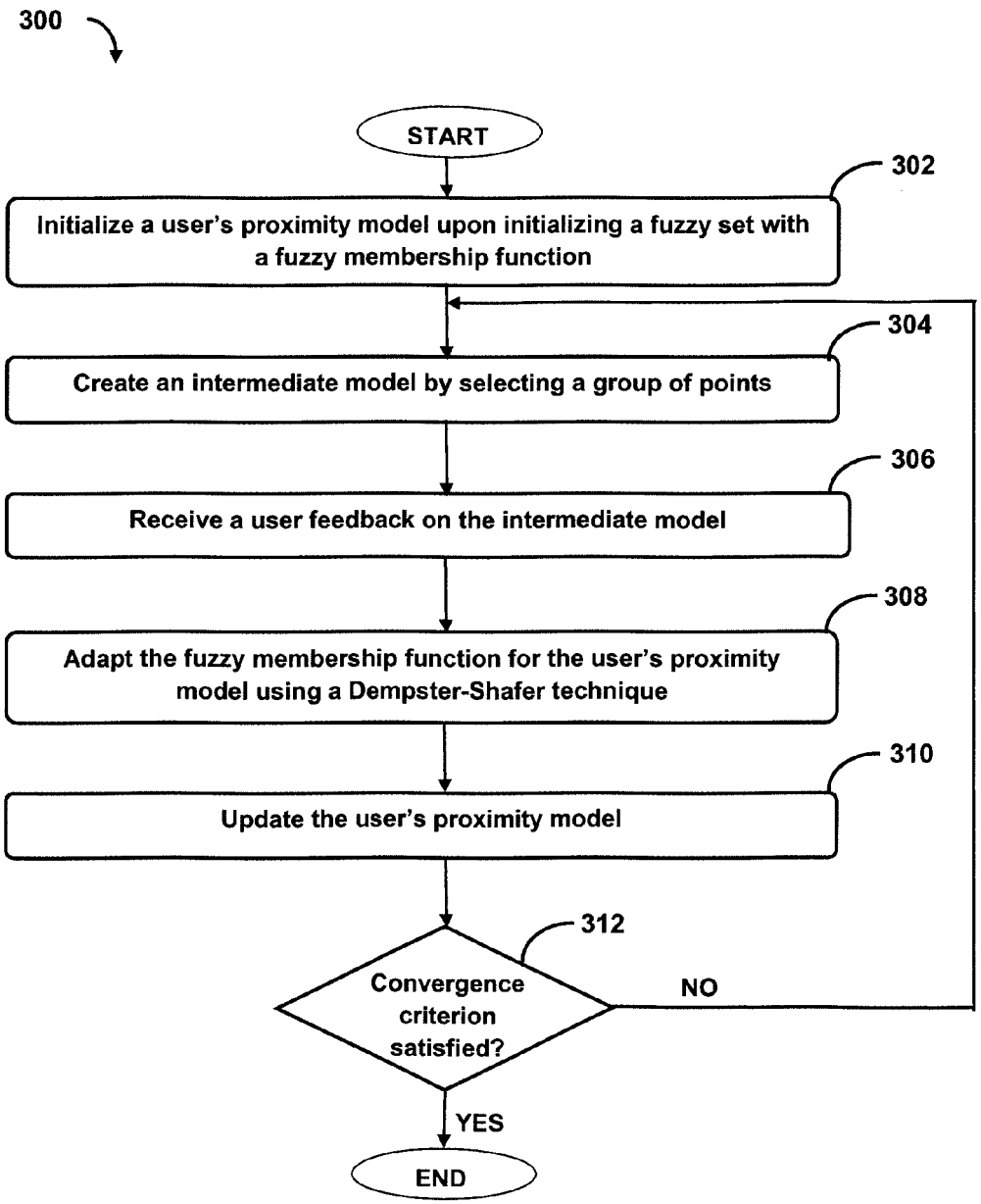
FIG. 3 shows a flowchart for illustrating a method for creating the user's proximity model in accordance with a user's feedback, in accordance with an embodiment of the present subject matter.

Referring now to FIG. 3 a flowchart 300 illustrating a method for creating a user's proximity model in accordance with a user's feedback, is shown in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300, as illustrated in FIG. 3, is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented on the above described Geographic Information System (GIS) 102.

At block 302, a user's proximity model may be initialized upon initializing a fuzzy set with a fuzzy membership function ($\mu_A$). The fuzzy set may comprise a plurality of points scattered around a reference point. Each point of the plurality of points may be associated with an integer. The integer may indicate a degree of closeness with respect to the reference point.

At block 304, an intermediate model may be created. The intermediate model may be created using the fuzzy set. Further, the intermediate model may be created by selecting a group of points from the plurality of points present in the fuzzy set. The group of points may be selected based upon a Kaufmann's index of fuzziness ($K_f$). Further, the intermediate model may be presented to the user.

At block 306, a user feedback on the intermediate model may be received from the user. The user feedback may indicate a user acceptance of the intermediate model. Further, the user feedback may be in a scale of 0 to 10.

At block 308, the fuzzy membership function ($\mu_A$) may be adapted for the user's proximity model using a Dempster-Shafer technique. The fuzzy membership function ($\mu_A$) may be adapted post calculating a belief function and a plausibility function using the Dempster-Shafer technique. Further, the belief function and the plausibility function may be computed based on the user feedback.

At block 310, the user's proximity model may be updated based upon the fuzzy membership function ($\mu_A$). The user's proximity model may be updated iteratively until a convergence criterion gets satisfied.

At block 312, it is checked if the convergence criterion is satisfied. The convergence criterion may be satisfied when the fuzzy membership function ($\mu_A$) remains same for a predefined number of successive iterations. In case the convergence criterion is not satisfied, the intermediate model may again be created by selecting the group of points, at the block 304. In case the convergence criterion is satisfied, the user's proximity model may be presented to the user.

Although implementations for methods and Geographic Information System (GIS) 102 for creating a user's proximity model in accordance with a user's feedback have been described in language specific to structural features and/or methods, it is to be understood that the appended claims are not necessarily limited to the specific features or methods described. Rather, the specific features and methods are disclosed as examples of implementations for creating a user's proximity model in accordance with a user's feedback.

We claim:

1. A method for creating a user's proximity model in accordance with a user's feedback, the method comprising:
   initializing, by a processor, a user's proximity model;

creating, by the processor, an intermediate model using the user's proximity model by selecting a group of points from the plurality of points, wherein the group of points is selected based upon a Kaufmann's index of fuzziness ($K_f$), and wherein the intermediate model is presented to a user;

receiving, by the processor, a user feedback on the intermediate model, wherein the user feedback is a score lying in a predefined range;

adapting, by the processor, the fuzzy membership function ($\mu_A$) for the user's proximity model using a Dempster-Shafer technique, wherein the fuzzy membership function ($\mu_A$) is adapted based on the user feedback, and wherein adapting the fuzzy membership function ($\mu_A$) using the Dempster-Shafer technique comprises:
  a) computing a belief function and a plausibility function based upon the user feedback; and
  b) computing a tuning parameter ($\alpha$) using the belief function and the plausibility function, wherein the fuzzy membership function ($\mu_A$) is adapted based upon the tuning parameter ($\alpha$); and updating, by the processor, the user's proximity model based upon the fuzzy membership function ($\mu_A$).

2. The method of claim 1, wherein selecting the group of points based on the Kaufmann's index of fuzziness ($K_f$) comprises:
  normalizing expected values of the Kaufmann's index of fuzziness ($K_f$) for achieving a probability distribution of the Kaufmann's index of fuzziness ($K_f$), wherein the expected values of the Kaufmann's index of fuzziness ($K_f$) represents a weighted average of values of the Kaufmann's index of fuzziness ($K_f$); and
  sampling the probability distribution of the expected values of the Kaufmann's index of fuzziness ($K_f$) to select the group of points.

3. The method of claim 1, further comprising iteratively performing one or more steps of creating the intermediate model, receiving the user feedback, adapting the fuzzy membership function ($\mu_A$), and updating the user's proximity model until a convergence criterion is satisfied or until the user feedback is the score of 10, wherein the convergence criterion is satisfied when the fuzzy membership function ($\mu_A$) is identical for a predefined number of successive iterations.

4. The method of claim 1, wherein the score is in a predefined range of 0 to 10.

5. The method of claim 1, further comprising using the user's proximity model by performing the steps comprising:
  receiving a search query provided by the user, wherein the search query is associated with at least one geographic criterion;
  determining search results in response to the search query, wherein the search results are determined from a geospatial database, and wherein the search results are based upon the user's proximity model; and
  presenting the search results to the user.

6. The method of claim 5, wherein the at least one geographic criterion is selected from the group consisting of a geographical location, a geographical orientation, a geographical distance, and a geographical area.

7. A Geographic Information System (GIS) for creating a user's proximity model in accordance with a user's feedback, the GIS comprises:
  a processor;
  a memory coupled to the processor, wherein the processor is capable for executing programmed instructions stored in the memory to:
    initialize a user's proximity model upon initializing a fuzzy set with a fuzzy membership function OW, wherein the fuzzy set comprises a plurality of points scattered around a reference point, and wherein each point of the plurality of points is associated with an integer, and wherein the integer indicates a degree of closeness of each point with respect to the reference point;
    create an intermediate model using the user's proximity model by selecting a group of points from the plurality of points, wherein the group of points is selected based upon a Kaufmann's index of fuzziness ($K_f$), and wherein the intermediate model is presented to a user;
    receive a user feedback on the intermediate model, wherein the user feedback is a score lying in a predefined range;
    adapt the fuzzy membership function ($\mu_A$) for the user's proximity model using a Dempster-Shafer technique, wherein the fuzzy membership function ($\mu_A$) is adapted based on the user feedback, and wherein adapting the fuzzy membership function ($\mu_A$) using the Dempster-Shafer technique comprises:
      a) computing a belief function and a plausibility function based upon the user feedback; and
      b) computing a tuning parameter ($\alpha$) using the belief function and the plausibility function, wherein the fuzzy membership function ($\mu A$) is adapted based upon the tuning parameter ($\alpha$); and
    update the user's proximity model based upon the fuzzy membership function ($\mu_A$).

8. The GIS of claim 7, wherein selecting the group of points based on the Kaufmann's index of fuzziness ($K_f$) comprises:
  normalizing expected values of the Kaufmann's index of fuzziness ($K_f$) for achieving a probability distribution of the Kaufmann's index of fuzziness ($K_f$), wherein the expected values of the Kaufmann's index of fuzziness ($K_f$) represents a weighted average of values of the Kaufmann's index of fuzziness ($K_f$); and
  sampling the probability distribution of the expected values of the Kaufmann's index of fuzziness ($K_f$) to select the group of points.

9. The GIS of claim 7, further comprising iteratively performing one or more steps of creating the intermediate model, receiving the user feedback, adapting the fuzzy membership function, and updating the user's proximity model until a convergence criterion is satisfied or until the user feedback is the score of 10, wherein the convergence criterion is satisfied when the fuzzy membership function ($\mu_A$) is identical for a predefined number of successive iterations.

10. The GIS of claim 7, wherein the score is in a predefined range of 0 to 10.

11. The GIS of claim 7, further comprising using the user's proximity model by performing the steps comprising:
  receiving a search query provided by the user, wherein the search query is associated with at least one geographic criterion;
  determining search results in response to the search query, wherein the search results are determined from a geospatial database, and wherein the search results are based upon the user's proximity model; and
  presenting the search results to the user.

12. The GIS of claim 11, wherein the at least one geographic criterion is selected from the group consisting of a geographical location, a geographical orientation, a geographical distance, and a geographical area.

13. A non-transitory computer readable medium embodying a program executable in a Geographic Information System (GIS) for creating a user's proximity model in accordance with a user's feedback, the program comprising:

a program code for initializing a user's proximity model upon initializing a fuzzy set with a fuzzy membership function ($\mu_A$), wherein the fuzzy set comprises a plurality of points scattered around a reference point, and wherein each point of the plurality of points is associated with an integer, wherein the integer indicates a degree of closeness of each point with respect to the reference point;

a program code for creating an intermediate model using the user's proximity model by selecting a group of points from the plurality of points, wherein the group of points is selected based upon a Kaufmann's index of fuzziness ($K_f$), and wherein the intermediate model is presented to a user;

a program code for receiving a user feedback on the intermediate model, wherein the user feedback is a score lying in a predefined range;

a program code for adapting the fuzzy membership function ($\mu_A$) for the user's proximity model using a Dempster-Shafer technique, wherein the fuzzy membership function ($\mu_A$) is adapted based on the user feedback, and wherein adapting the fuzzy membership function ($\mu_A$) using the Dempster-Shafer technique comprises:

a) computing a belief function and a plausibility function based upon the user feedback; and b) computing a tuning parameter ($\alpha$) using the belief function and the plausibility function, wherein the fuzzy membership function ($\mu_A$) is adapted based upon the tuning parameter ($\alpha$); and a program code for updating the user's proximity model based upon the fuzzy membership function ($\mu_A$).

* * * * *